US007357034B1

(12) United States Patent
Worthington

(10) Patent No.: US 7,357,034 B1
(45) Date of Patent: Apr. 15, 2008

(54) DYNAMIC TRANSIENT PRESSURE DETECTION SYSTEM

(76) Inventor: Loren Worthington, 16246 N. 18th Pl., Phoenix, AZ (US) 85022

( * ) Notice: Subject to any disclaimer, the term of this patent is extended or adjusted under 35 U.S.C. 154(b) by 0 days.

(21) Appl. No.: 11/641,686

(22) Filed: Dec. 20, 2006

Related U.S. Application Data

(62) Division of application No. 10/927,120, filed on Aug. 27, 2004, now Pat. No. 7,219,553.

(60) Provisional application No. 60/501,846, filed on Sep. 11, 2003.

(51) Int. Cl.
*G01L 9/00* (2006.01)

(52) U.S. Cl. .................................................. 73/753

(58) Field of Classification Search .................. 73/753
See application file for complete search history.

(56) References Cited

U.S. PATENT DOCUMENTS 4,772,388 A * 9/1988 Allington ................ 210/198.2
5,154,152 A * 10/1992 Yamane et al. ............ 123/492
5,337,750 A * 8/1994 Walloch ..................... 600/493
6,567,709 B1 * 5/2003 Malm et al. .................. 700/21
6,865,472 B2 * 3/2005 Nakamura .................. 701/108
7,219,553 B1 * 5/2007 Worthington ................ 73/753

* cited by examiner

*Primary Examiner*—Max Noori
(74) *Attorney, Agent, or Firm*—James Creighton Wray; Clifford D. Hyra

(57) ABSTRACT

The present invention is a dynamic transient pressure detection system for detecting and recording variations in pressure inside operating fluid chambers. One or more dynamic pressure sensors are installed inside an operating fluid chamber. Pressure is continuously measured and recorded with a high degree of accuracy. Transients are detected and data samples are stored and processed to locate the source of the transients and to provide information for preventing transients during future operations. A clock or timer records the chronological time of detection for each sample. The clock or timer may be connected to a Global Positioning System to assist in determining the source of transient pressures.

18 Claims, 3 Drawing Sheets

DYNAMIC TRANSIENT PRESSURE DETECTION SYSTEM

This application is a division of application Ser. No. 10/927,120 filed Aug. 27, 2004 now U.S. Pat. No. 7,219, 553.

This application claims the benefit of U.S. Provisional Application No. 60/501,846, filed Sep. 11, 2003.

BACKGROUND OF THE INVENTION

The measurement of pressure in pipelines and other operating fluid chambers is very important to many industrial applications, and in particular to gas, petroleum, sewage and water utilities. Irregular pressures can cause catastrophic effects to mechanical systems and result in large losses of time and money.

Generally, pressure pipelines are designed with enough structural strength to withstand both normal operating pressures and transient pressures. Pressure transients occur whenever there is a change in the flow rate in a pipeline and can be significantly higher and/or lower than normal operating pressures. Causes of transient pressures include opening or closing a valve, starting or stopping a pump, or operation of an air relief valve.

Under normal circumstances, transient pressures are predictable and readily accommodated by pipeline design. For example, main line butterfly valves are designed to close over a period of minutes to minimize transient pressures. Pump motors are designed to start against a closed valve and the valve gradually opens to minimize transient pressures.

The presence of air pockets has a number of potentially adverse effects on the operation of a pipeline, including the aggravation of transient pressures. Therefore, air valves are included in pipeline design to discharge accumulated air pockets to minimize this problem.

Other instances of transient pressures are more difficult to predict accurately and, thus, they are not included in pipeline design, for example, a sudden power outage in a pumped pipeline system causes an abrupt cessation of flow in the pipeline and a large transient pressure. This is a predictable transient, although it is very difficult to analyze and design a system to deal with this type of transient. In a worse case scenario, a power loss causes cavitation in the water column and an extremely high pressure over a short duration. The presence of air pockets in the pipeline aggravates this problem by increasing the chances of cavitation, water column separation and damaging pressures. Water column separation results with the appearance of negative pressures in certain reaches of a water main Pressures drop to water vapor pressure, causing vapor pockets. When the inertia of the water column is overcome, the direction of flow reverses, causing the vapor pockets to collapse and the separated columns to rejoin. Extremely high, destructive pressures result.

Another example of problematic transients is the rupture of a pipeline causing flow rates far in excess of design velocities. Attempts to close butterfly or similar valves can result in catastrophic structural failure of the valve. Pressures of this magnitude are not anticipated by pipeline design.

Hydraulic transient analysis procedure do exist, however, transient pressure prediction is a complex procedure requiring digital modeling of specific pipeline configurations, operating procedures and expected flow considerations. Considerable judgment and experience is needed to model a pipeline operation and accurately anticipate those conditions that will result in the highest transient pressures. Frequently, pipeline design simply predicts that transient pressures will be a fixed percentage above normal operating pressure and pipelines are then designed on this assumption. For example, transient pressures in water pipelines may be assumed to be 40% above normal operating pressure.

Damage from transient pressures can be benign or catastrophic. Less serious effects include gradual spalling of the inner surface of the pipe or damage to joint materials. In concrete pressure pipe materials, the stress levels may result in cracking of mortar on the exterior surface of the pipe, leading to the eventual compromise of the protection of prestressing. This damage, in turn, results in the introduction of water and air to the steel and subsequent corrosion. The corrosion, gradual fracture and deterioration can lead to catastrophic rupture many years after the damaging events. When rupture does occur, there will be no record of the source of the problem. Alternatively, the most severe transient events may cause movement of a pipe or an immediate catastrophic rupture. Damage is most severe in thin-walled pipes, lined pipes and concrete cylinder pipes.

Most of the country's infrastructure is aging and there are limited funds for replacement. Unpredictable pressure transients can have a severe effect on these systems. The resultant distress from transient pressures accumulates over time, causing a rupture long after the damaging transient occurs.

Current systems for detection of transient pressures are not adequate to measure and record severe transient pressures. Current analog pressure measurement systems continuously record pressure at a constant rate. This rate is established to present the data in the timeframe and format required by the user, but the fixed rate does not have the flexibility to present detailed data concerning sharp transient pressures when these transient pressures are detected. Current digital pressure measurement systems measure and record pressure data at a predetermined, fixed interval. The interval may be set permanently into the system, or it may be user adjustable. For instance, the interval may be once per day, once per hour, or even once per minute in the most rigorous pressure measurement systems. However, some of the most severe transients will have a duration of less than one second, and will not be accurately measured by set-interval data recording systems. Existing systems cannot, in a practical way, measure and record the most severe, unpredictable transients.

Needs exist for improved and practical methods for detecting and accurately recording transient pressures in pipelines and other operating fluid chambers.

SUMMARY OF THE INVENTION

The present invention is a dynamic transient pressure detection system for detecting variations of pressure inside operating fluid chambers. Pressure is continuously measured and recorded with a high degree of accuracy. Transients are detected and data samples are stored and processed to locate the source of the transients and to provide information for preventing transients during future operations.

The dynamic transient pressure detection system of the present invention includes a dynamic pressure sensor installed in an operating fluid chamber. The operating fluid chamber can be a pipeline or any other equipment with enclosed fluids. The dynamic pressure sensor continuously measures the pressure and time of sampling without operator interface. A transmission system transfers a signal from the dynamic pressure sensor to a receiver. The signal indicates pressure within the operating fluid chamber. For each signal, a clock or timer records chronological time of each measurement signal detection. The clock or timer may be a Global Positioning System receiver for obtaining and sending geographic location of the instrument and time of detection to a signal processor. Time is measured to the required accuracy, and may be as high as approximately microsecond accuracy. A signal processor receives signals, converts signals if needed and records data. A data management program then analyzes the collected data and displays results.

During operation of the dynamic transient pressure detection system, the signal processor records single data samples at a predetermined periodic interval. The signal processor records any variation in pressure above a set threshold level within internal memory until pressure measurements again returns to a steady state.

The present invention is also a method for detecting dynamic transient pressures. The first step in the process is to install a dynamic pressure sensor in an operating fluid chamber. The sensor then measures fluid pressures in the operating fluid chamber and transmits data sample information to a receiver. Data sample information is taken, though not necessarily permanently recorded, at a predetermined interval that is sufficient to adequately define the most severe transient pressures. This sample rate will be referred to as the High Sample Rate. Once the data sample information is at the receiver, a signal processor analyzes the information and identifies transient pressures in the operating fluid chamber. When a transient pressure is detected, data sampling rates and/or data recording rates are increased up to the High Sample Rate until pressures reach steady state. Transient pressure data is stored in internal memory. The collected data is analyzed with a data management program, and the results are displayed to the user.

In order to accurately identify transient pressures, either the user or the system must define transient pressure parameters. The definition of transient pressure parameters may include the definition of an absolute threshold of pressure change for the operating fluid chamber. The definition of transient pressure parameters may include a statistical departure from the steady state pressure. The background, steady state pressure data is generally stored periodically at a second, lower sampling rate. The operator can adjust the data sample recording frequencies as needed for a particular application. When the sensors record a pressure measurement that, when compared to the steady state pressure, is outside the set pressure threshold, the pressure data is temporarily stored in a buffer at the High Sample Rate. The data taken at the High Sample Rate are recorded in internal memory during a transient condition. High frequency data recording continues until the pressure in the operating fluid chamber returns to a steady state value or the user specifies a return to normal recording rates. When a measurement is outside the pressure threshold, the data is permanently stored in the buffer and the second sampling or recording rate is increased to the High Sample Rate. The pressure data is permanently stored in the buffer at the High Sample Rate. Times of detection and/or position of the sensor are recorded and sent with the temporarily and permanently stored and recorded data. A time and/or position receiver may be installed with the sensor for receiving and sending time and position signals with the pressure signals. Potential information may be transmitted from the sensor.

In a preferred embodiment, when a threshold of pressure representing hazards to persons or structures is reached, an alarm is transmitted to alert a user when this threshold is reached or exceeded. Additionally, the system may be used to locate and identify the source of the transient. Using this identification system, unknown or illegal points of diversion of fluid from the pipeline or chamber may be identified.

Data sampling rates can vary widely depending on the use and are set by an operator using the principles of physics and digital data processing; however, multiple samples per second are normally taken by the system. The High Sample Rate data may be, but is not limited to, thousands of samples per second. Under steady pressure conditions, most of these data samples are analyzed, erased and not permanently recorded. If the user desires, data samples in steady pressure conditions may be recorded at rates including, but not limited to, once per day.

Effectiveness of the present invention is improved with the installation of more than one dynamic pressure sensors in an operating fluid chamber. The use of multiple dynamic pressure sensors allows for the identification of the source of a pressure transient using two or more dynamic pressure sensors. Data may be analyzed from one or multiple test sites simultaneously. Each dynamic pressure sensor has the ability to transmit data to a central signal processor. Background noise levels are determined from sensor data and background information may be removed from the pressure data in a data management step or any other stage of the data collection and analysis.

The source of transient pressures may be determined from the time of detection and other data characteristics. The dynamic transient pressure detection system differs from existing systems in its ability to identify and accurately record transient pressures based on user-defined parameters. During transient pressure detection, data sampling rates remain constant, however, all of the data samples are recorded, which has the effect of increasing the data recording frequency. Measurements of pressure, taken at up to thousands of times per second or more, are permanently recorded to depict the pressure throughout the transient condition.

The remote signal processor located at each test site receives data samples from one or more sensors and performs the function of identifying the presence of transient pressure conditions. Data received from the sensor is temporarily stored, in a buffer or otherwise, for a predetermined period. Background noise levels are established and the statistical characteristics of the samples are continuously updated. The signal processor analyzes the data and displays output for the operator. The signal processor includes a data management program for analyzing, storing and displaying the data collected from one or more sensors. Using more than one sensor allows the operator to detect the source of a transient pressure in two or three-dimensions.

Results of testing by the invention may be transmitted and displayed to the user in tabular form, graphic form, electronic form, internet web site displays, or other format to permit review and analysis by the user.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
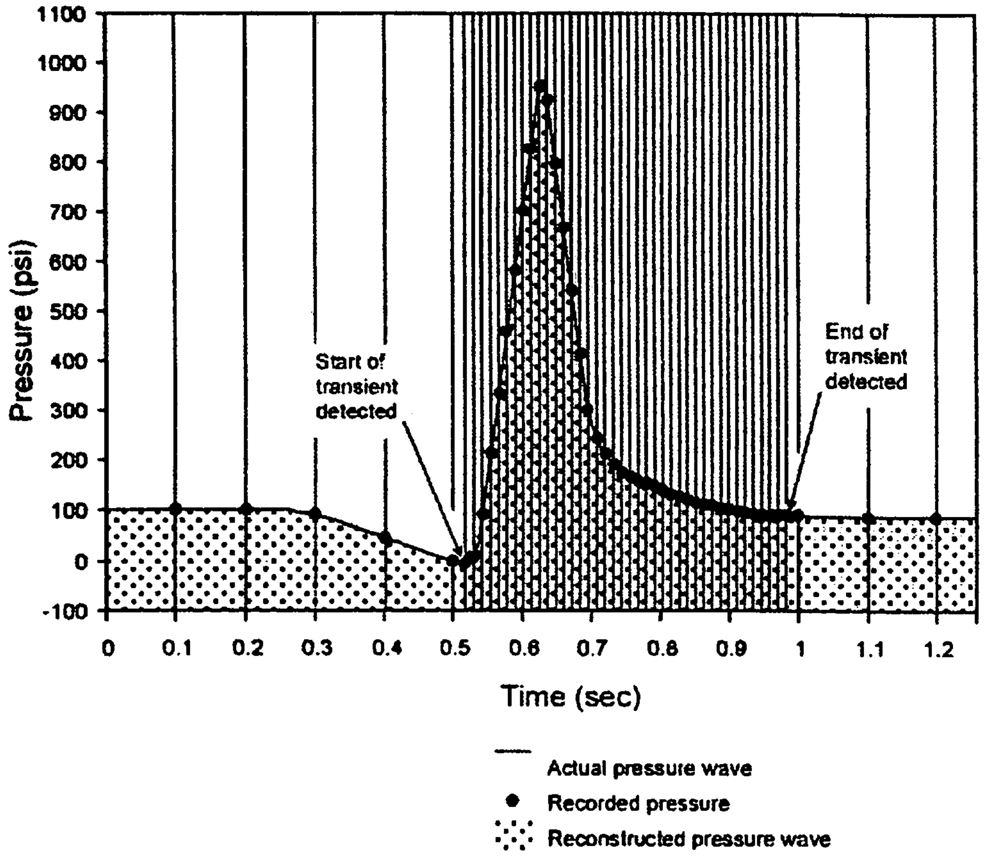
FIG. 1 is a graph of pressure versus time showing the dynamic transient pressure detection method.

The present invention is a dynamic transient pressure detection system for detecting and recording variations in pressure inside operating fluid chambers. One or more dynamic pressure sensors are installed inside an operating fluid chamber. Pressure is continuously measured and recorded with a high degree of accuracy. Transients are detected and data samples are stored and processed to locate the source of the transients and to provide information for preventing transients during future operations. A clock or timer records the chronological time of detection for each sample. The clock or timer may be connected to a Global Positioning System or other accurate chronometers to assist in determining the source of transient pressures.

The dynamic transient pressure detection system of the present invention includes a dynamic pressure sensor installed in an operating fluid chamber. The operating fluid chamber can be a pipeline or any other equipment with enclosed fluids. The dynamic pressure sensor continuously records the background pressure and time of sampling. Data sampling rates can vary widely depending on the use and are set by an operator. Background data samples are recorded at rates from about once per second to about once per day, depending on the user's needs. Data are recorded in a temporary buffer for a predetermined amount of time or in permanent internal memory.

The dynamic transient pressure detection system identifies transient pressures based on user-defined parameters. During transient pressure detection, data sampling rates remain constant, however, the data are all recorded in permanent storage. Measurements are taken and recorded at up to thousands of times per second or more. The operator can also set higher frequencies if needed for a particular application. The data collected during these high sampling rates are analyzed in order to find rapid pressure changes that indicate transient pressures. When a transient pressure is detected, the higher data sampling rate information is recorded in permanent, internal memory. High frequency data detection and recordation continues until the pressure in the operating fluid chamber returns to a steady state value or as long as the operator desires.

Multiple dynamic pressure sensors can be installed on an operating fluid chamber. With multiple sensors, it is possible to accurately identify the source of a transient pressure. Two sensors can locate the source of a transient pressure in one-dimension. Combining three or more sensors allows the operator to pinpoint the source of a transient in two or three-dimensions. Each dynamic pressure sensor has the ability to transmit data to a central signal processor for analysis. Each sensor transmits a calibrated signal indicating pressure within an operating fluid chamber. Individual sensors are synchronized using a precision timer or other synchronization mechanism.

Additionally, each dynamic pressure sensor has a clock or timer to record the chronological time of detection for each sample. The clock or timer may be a Global Positioning System receiver that obtains the geographic location of the instrument and time of detection. Time is measured to millisecond accuracy, or greater.

The central signal processor receives data samples from one or more sensors. Data received from the sensor is temporarily stored in a buffer for a predetermined period. Background noise levels are established and the statistical characteristics of the samples are continuously updated. Any variation in pressure above a user-set threshold level causes all data in the buffer to be recorded in internal memory. The recordation of data into the internal memory continues until pressure has returned to a steady state or as long as the operator wishes. At that time, normal data recordation resumes.

The signal processor analyzes the data and displays output for the operator. The signal processor includes a data management program for processing, analyzing and displaying the data collected from one or more sensors. Using more than one sensor allows the signal processor to detect the source of a transient pressure in two or three-dimensions. The determination of the point of origin of a transient in one-dimension is based on the following formula:

$$X1 = \frac{V(T1 - T2) + L}{2}$$

where:

X1 is the distance from test site 1

V is the velocity of the energy wave in the fluid medium

T1 is the time of detection at test site 1

T2 is the time of detection at test site 2

L is the distance between the sensors

This formula ignores the velocity of the fluid. If desired, the formula can be modified to take into account the fluid velocity.

FIG. 1 shows a graph of pressure versus time for a hypothetical measurement scenario. The pressure is at steady state from time 0 sec to 0.3 sec. Sampling occurs every 0.01 seconds, however, it is recorded every 0.1 seconds. In other words, 9 out of every 10 data samples are not permanently recorded. The beginning of a transient is detected at about 0.5 seconds and all samples are permanently recorded until the end of the transient at about 1.0 second. At this time, the pressure has regained steady state and the sample recording rate is lowered to levels equal to those before the transient detection.

Figure 2:
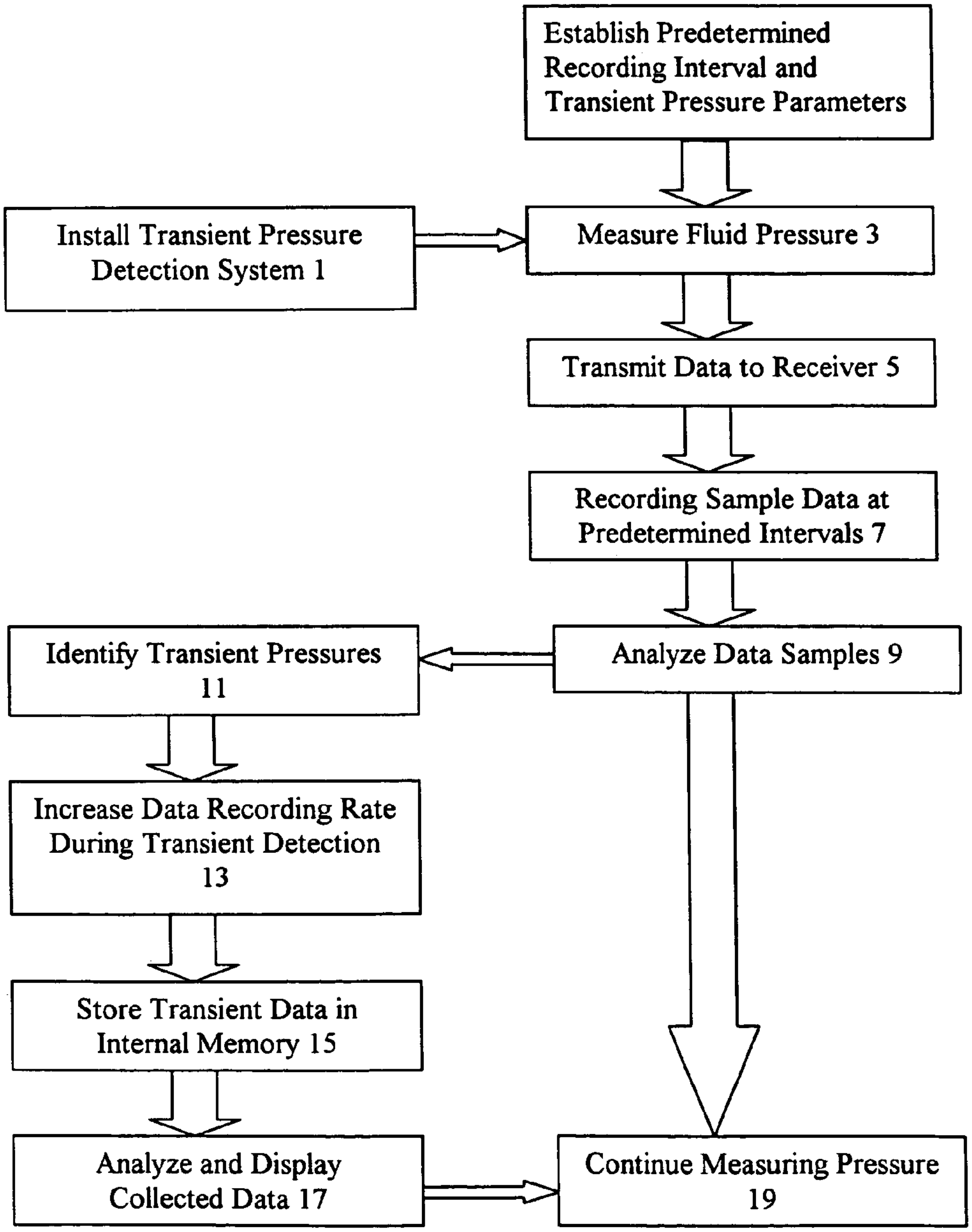
FIG. 2 is a flowchart of the stages of transient pressure detection.

FIG. 2 is a flowchart of the present method for detecting and analyzing transient pressures. Initially, one or more dynamic pressure sensors are installed 1 in an operating fluid chamber or pipeline. These sensors continuously measure 3 fluid pressures and transmit 5 data sample information to a receiver. Recording 7 is performed at a predetermined interval. Samples are then analyzed 9 to determine if transient pressures exist. If a transient pressure is detected 11, the rate of data sampling and/or data recording rates are increased 13. This continues until pressures reach a steady state. Transient pressure data is stored in internal memory 15. This data is then analyzed and displayed 17 using a data management program. Once normal pressures are resumed, or if no transient pressures are detected, the dynamic transient pressure detection system of the present invention continues measuring pressure at a predetermined rate.

Figure 3:
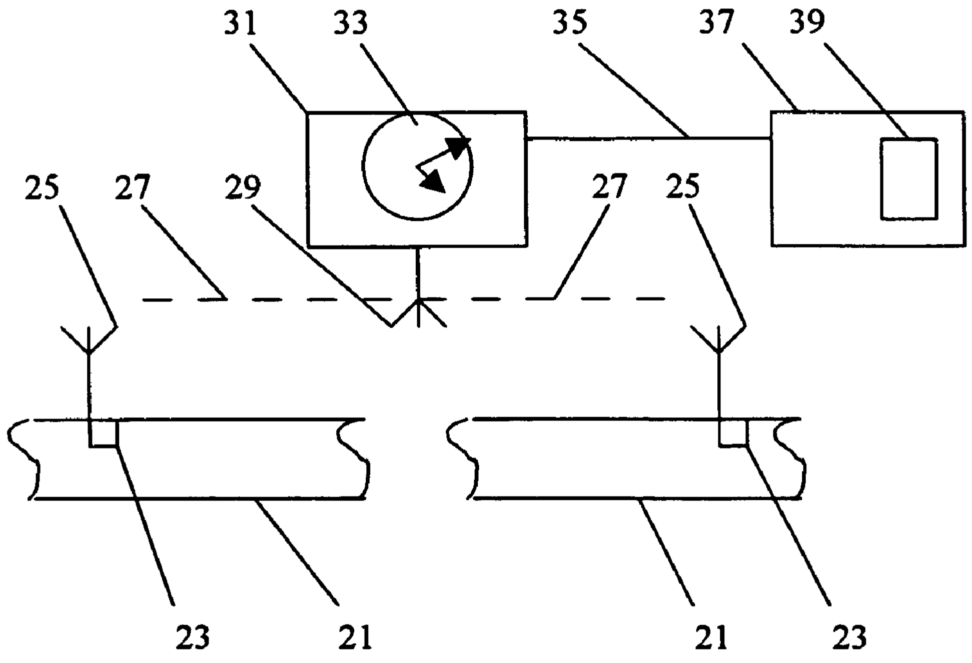
FIG. 3 is a diagram of a dynamic transient pressure detection system.

FIG. 3 shows a dual sensor configuration for a dynamic transient pressure detection system. The system starts with one or more segments of pipeline 21 with pressure sensors 23 installed. Each sensor 23 has a means of transmitting information 25. The transmission means 25 can be wire, fiber, wireless, or other method; and the data format can be digital, analog, or other. Data is transmitted in real time, or as information batches, depending on the needs of the user. The transmission 27 from the sensors 23 to a corresponding receiver 29 on a receiving device 31 transfers data about the conditions in the fluid chamber 21. The receiving device 31 includes a clock or timer 33 for recording chronological time detection. The receiving device 31 is then connected 35 to a signal processor 37 that receives the signals and recorded data. A data management system 39 within the signal processor 37 analyzes and displays the collected data.

While the invention has been described with reference to specific embodiments, modifications and variations of the invention may be constructed without departing from the scope of the invention, which is defined in the following claims.

The invention claimed is:

1. A method for detecting dynamic transient pressures comprising:

installing a dynamic pressure sensor in an operating fluid chamber, measuring fluid pressures in the operating fluid chamber, transmitting data sample information from the dynamic pressure sensor to a receiver and signal processor, recording data sample information at a predetermined interval, analyzing data samples with the signal processor, identifying transient pressures in the operating fluid chamber, increasing data sampling rates and/or data recording rates during transient detection until pressures reach steady state, storing transient pressure data in internal memory, and analyzing and displaying collected data alone or with other kinds of data from other sources, using a data management program.

2. The method of claim 1, further comprising defining transient pressure parameters.

3. The method of claim 1, further comprising installing multiple dynamic pressure sensors in an operating fluid chamber.

4. The method of claim 3, further comprising identifying a source of a transient pressure using two or more dynamic pressure sensors.

5. The method of claim 3, further comprising analyzing data from one or multiple test sites simultaneously.

6. The method of claim 3, further comprising identifying an unknown or illegal diversion of pressure.

7. The method of claim 1, further comprising recording time of transient detections using a clock or timer, and determining a source of transient pressure from the time of detection and other data characteristics.

8. The method of claim 7, wherein the clock or timer is a Global Positioning System receiver.

9. A method of detecting pressure transients in operating fluid chambers comprising:

defining pressure threshold in a chamber, installing at least one pressure sensor in the chamber, sensing pressure in the chamber with the sensor, transmitting pressure data from the sensor to a receiver, temporarily storing the pressure data in a buffer at a first, higher sampling rate, periodically permanently storing the pressure data at a second, lower rate, comparing the pressure data with the defined pressure threshold, upon receiving the pressure data at values outside of the threshold:

permanently recording the pressure data in the buffer, increasing the second rate to match the first rate, permanently storing the pressure data at the first, higher rate, and analyzing the pressure data recorded at the first, higher rate.

10. The method of claim 9, further comprising recording times of transmission with the temporarily and permanently stored and recorded pressure data.

11. The method of claim 10, further comprising providing a time receiver at the sensor, receiving time signals at the sensor, and transmitting time indications with the pressure data transmission.

12. The method of claim 11, further comprising transmitting potential information from the sensor.

13. The method of claim 11, further comprising receiving position signals and generalizing position information at the sensor and transmitting the position information with the time indications and the pressure data.

14. The method of claim 9, further comprising determining background level noise and removing background noise from the pressure data.

15. The method of claim 9, wherein the fluid chamber is a pipeline and wherein the at least one sensor comprises multiple sensors, further comprising time and position signal receivers connected to the sensors for receiving time and position signals and further comprising transmitting time and position indications with the pressure data.

16. The method of claim 9, further comprising identifying a predetermined threshold pressure and alerting a user when the predetermined threshold is reached or exceeded.

17. The method of claim 9, further comprising identifying an unknown or illegal point of diversion of fluid from the chamber as a source of a transient pressure.

18. A method of monitoring pressure comprising:

installing transient pressure sensors within an operating fluid chamber, establishing predetermined data sampling rates, establishing predetermined sample data recording rates, establishing transient pressure parameters, measuring fluid pressures, transmitting fluid pressure sample data to a receiver and signal processor, recording sample data at the predetermined recording rates, analyzing sample data, comparing sample data to the transient pressure parameters for identifying transient pressures, increasing data sampling rates and data recording rates during transient detection, storing transient data in internal memory, analyzing and displaying collected data, and returning data sampling rates and data recording rates to predetermines rates when sample data returns to non-transient pressure parameters.

* * * * *